United States Patent Office

3,387,003
Patented June 4, 1968

1

3,387,003
PROCESS FOR THE PRODUCTION OF 3-METHYL-2-CYCLOPENTENE-4-OL-1-ONES
Jacques Martel, Bondy, Chanh Huynh, Villemonble, and Gerard Nomine, Noisy-le-Sec, France, assignors to Roussel - UCLAF, Paris, France, a corporation of France
No Drawing. Filed Jan. 19, 1966, Ser. No. 521,531
Claims priority, application France, Jan. 22, 1965, 2,966
6 Claims. (Cl. 260—343.5)

ABSTRACT OF THE DISCLOSURE

Novel process for the preparation of 3-methyl-2-cyclopentene-4-ol-1-ones of the formula

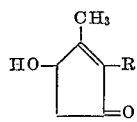

I wherein R is selected from the group consisting of hydrogen and aliphatic hydrocarbons of 1 to 8 carbon atoms by preparing a novel 4-R-5-diloweralkoxymethyl-5-methyl-3-oxo-8-valerolactone, wherein R has the above definition and treating said lactone with an aqueous strong acid.

PRIOR ART

The cyclopenteneolones of Formula I are of great commercial value, particularly in the agricultural field since natural products such as pyrethrines and cinerines and synthetic products such as allethrine are esters of chrysanthemic acid or pyrethic acid and various cyclopenteneolones of Formula I. The said esters show remarkable insecticidal activity with very low toxicity to man and warm-blooded animals. Particular useful cyclopenteneolones are pyrethrolone [cis 2-(2,4-pentadienyl)-3-methyl-2-cyclopentene-4-ol-1-one], cinerolone [cis 2-(2-butenyl)-3-methyl-2-cyclopentene-4-ol-1-one] and allethrolone [2-allyl-3-methyl-2-cyclopentene-4-ol-1-one].

While cis-pyrethrolone and cis-cinerolone may be obtained by starting with pyrethrins and cinerines of natural origin, allethrolone cannot be prepared by synthetic means. La Forge, Green and Schechter were the first to have described allethrolone and its ester with chrysanthemic acid, allethrine (see for example J. Am. Chem. Soc. 71 (1949), page 1517). Thereafter, with the commercial importance being pointed out, a great number of studies have been undertaken to improve the process initially described without modifying the basic order of steps of the said reaction scheme.

The process for the preparation of allethrolone described by La Forge and Schechter in the French Patent No. 1,011,572, is essentially characterized in that in the first step the pyruvaldehyde is condensed by an aldol condensation with an alkali metal salt of γ-allyl acetyl-acetic acid to form compound A of Table I, which is spontaneously decarboxylated to aldol B which is recovered.

2

TABLE I

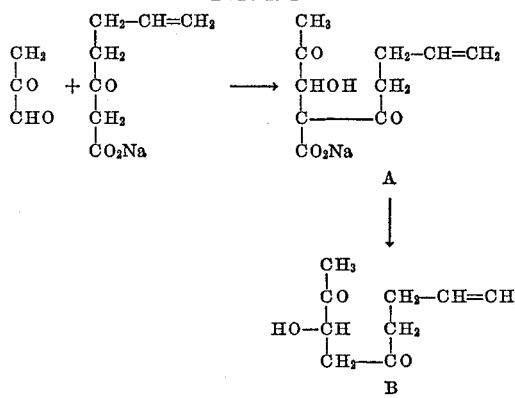

In the second step, aldol B is cyclized under the action of aqueous sodium hydroxide to allethrolone by intramolecular crotonization as in Table II.

TABLE II

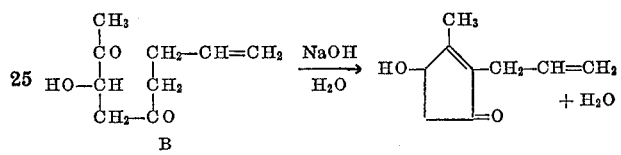

The theory of the process by La Forge may be summarized as a first stage condensation by bimolecular aldolization and a second stage cyclization by intramolecular crotonization. It follows therefrom that the percentage of conversion of aldol B into allethrolone is relatively small. Besides, allethrolone prepared in this manner in contaminated by various impurities, which are rather difficult to eliminate. In short, the process by La Forge is reproducible with difficulty. These weighty drawbacks are probably due to the fact, that the reaction, necessitating the most arduous of working conditions, particularly for the crotonization, is effected after the aldolization and thus causes irreversible degradations on all participating compounds, in particular aldol B.

OBJECTS OF THE INVENTION

It is an object of the invention to provide a novel process for the preparation of 3-methyl-2-cyclopentene-4-ol-1-ones of Formula I which avoids the difficulties of known processes.

It is another object of the invention to provide novel intermediates for 3-methyl-2-cyclopentene-4-ol-1-ones of Formula I.

These and other objects and advantages of the invention will become obvious from the following detailed description.

THE INVENTION

The novel process of the invention for the preparation of 3-methyl-2-cyclopentene-4-ol-1-ones of the formula

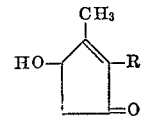

I wherein R is selected from the group consisting of hydrogen and an aliphatic hydrocarbon of 1 to 8 carbon atoms comprises reacting a di-lower alkyl acetal of pyruvic aldehyde with an ester of γ-R-acetylacetic acid wherein R has the above definition under anhydrous conditions in the presence of an alkaline agent to form the corresponding 4-R-5-di - loweralkoxymethyl-5-methyl-3-oxo-δ-valerolactone and treating the latter with an aqueous acid to form the corresponding 2-R-3-methyl-2-cyclopentene-4-ol-1-one. The reaction scheme is summarized in Table III.

TABLE III

CH₃—CO—CH(OR″)₂ + R—CH₂—CO—CH₂—CO₂R′

↓

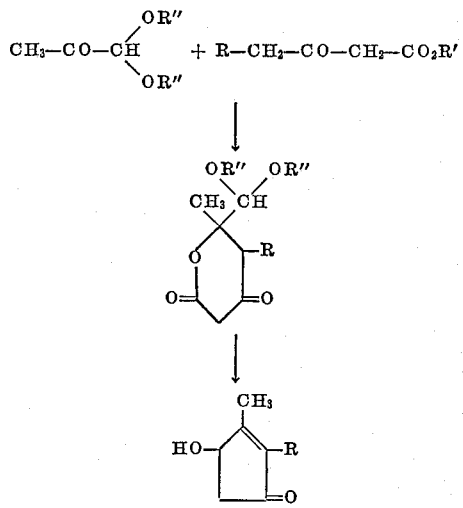

wherein R is selected from the group consisting of hydrogen and an aliphatic radical of 1 to 8 carbon atoms and R′ and R″ are lower alkyl radicals of 1 to 7 carbon atoms.

Since the reaction of the di-lower alkyl acetal of pyruvic aldehyde with the ester of γ-R-acetylacetic acid is conducted under non-aqueous conditions such as in liquid ammonia, it is likely that the said acetal exists in form of a dianion as shown in Table IV. Under these conditions, a β-oxo-δ-valerolactone is unexpectedly formed. It is theorized, without limiting the invention thereto, that the aldolization of the ketone function of the acetal of pyruvic aldehyde is not followed by a crotonization but by an intramolecular attack of the ester groups of the acetylacetic acid ester which results in the formation of the δ-lactone in Table IV.

TABLE IV

R′O₂C—CH₂—CO—CH₂—R

↓

R′O₂C—$\overset{\ominus}{C}$H—CO—$\overset{\ominus}{C}$H—R + CH₃—CO—CH(OR″)₂

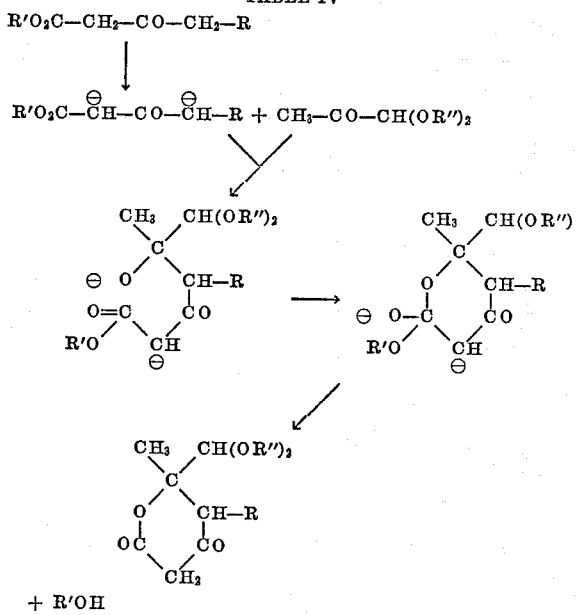

+ R′OH

The treatment of the δ-lactone with an aqueous acid probably effects the opening of the lactone ring, followed by crotonization, deacetalization of the aldehyde function, conversion of the β-ketone acid to the corresponding methylketone by decarboxylation and cyclization by intramolecular aldolization to the desired cyclopenteneolone. The conversion of the δ-lactone to the final product is effected probably by a series of reactions closely overlapping one another. It is probable that an intermediate as shown in Table V is formed whose aldolization leads to the final product.

TABLE V

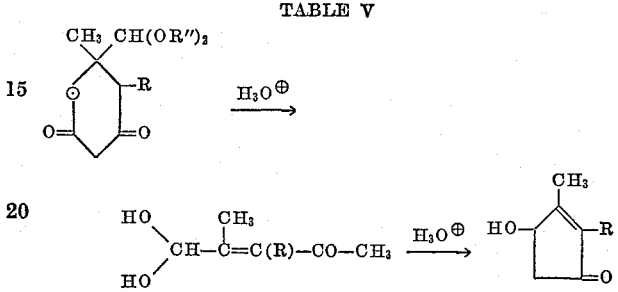

Therefore, the process of the invention is clearly distinguished from the known process of La Forge. In addition to the above advantages, the process uses acetylacetic acid esters as starting materials rather than the alkali metal salts of the acetylacetic acids. Moreover, 3-methyl-2-cyclopentene-4-ol-1-one, which is potentially of commercial interest, can be prepared by the process of the invention which was not possible by the La Forge process.

Examples of 3 - methyl - 2 - cyclopentene-4-ol-1-ones which can be prepared by the process of the invention are 2 - allyl - 3 - methyl-2-cyclopentene-4-ol-1-one, 2-(2-methylallyl) - 3 - methyl-2-cyclopentene-4-ol-1-one, 2-(2-butenyl)-3-methyl-2-cyclopentene-4-ol-1-one, 3-methyl-2-cyclopentene-4-ol-1-one, 2,3 - dimethyl-2-cyclopentene-4-ole-1-one, etc.

The bimolecular condensation of the acetal of pyruvic aldehyde and the acetylacetic acid ester is effected in anhydrous conditions, preferably in liquid ammonia in the presence of an alkali metal amide such as sodium amide or in the presence of an alkali metal hydride such as sodium hydride in a 1,2-dimethoxy ethane media.

The second step of the process is effected by treating the δ-lactone with an aqueous acid at reflux for a period of time. Aqueous hydrochloric acid and reflux periods of several hours are preferred but other acids such as hydrobromic acid and sulfuric acid may also be used.

In the following examples there are described several preferred embodiments to illustrate the invention. However, it should be understood that the invention is not intended to be limited to the specific embodiments.

*Example I.—Preparation of allethrolone or 2-allyl-3-methyl-2-cyclopentene-4-ol-1-one*

Step A: Preparation of 4 - allyl - 5 - diethoxymethyl - 5-methyl-3-oxo-δ-valerolactone.—500 mg. of ferric nitrate were introduced into 800 cc. of liquid ammonia at −70° C. with agitation and then 18.4 gm. of sodium were slowly added thereto to form a solution of sodium amide. Then, 68.8 cc. of ethyl γ-allylacetylacetate in 400 cc. of anhydrous ether were added to the said solution and within a half hour the liquid ammonia was removed from the solution by heating it over a bath maintained at 20° C. Then, 63.2 cc. of the diethylacetal of pyruvaldehyde in 300 cc. of anhydrous ether were introduced, and the reaction mixture was vigorously agitated for a half hour at a temperature of −60° C. 60 gm. of ammonium chloride were added to the reaction mixture, which was then acidified while under thorough cooling by addition of 120 cc. of concentrated hydrochloric acid diluted with 250 cc. of an aqueous solution of sodium chloride. The resulting mixture was extracted with ether and the organic phase was washed with an aqueous solution of sodium chloride. After drying, the ether solvent was removed by distillation to obtain an oil, which was rectified. The top fraction distilling between 30 and 90° C. under a 0.1 mm. vacuum was discarded and the rectification of the residue was continued, with the fraction of the residue distilling between 145 and 150° C. under a 0.1 mm. vacuum being recovered. The said fraction was crystallized from an isopropyl ether-petroleum ether mixture (1:1) by scratching to induce crystallization. Then, the crystallized fraction was iced for 1 hour and then vacuum filtered to obtain 4-allyl-5-diethoxymethyl-5-methyl-3-oxo-δ-valerolactone having a melting point of 70° C.

This product occurred in the form of prisms which were slightly soluble in cold water and soluble in most of the common organic solvents.

Ultra-violet spectra:
(1) mixture of ethanol—N/10 hydrochloric acid $$\lambda_{max.}=248\text{--}249 \text{ m}\mu; \epsilon=6{,}200$$

(2) mixture of N/10 sodium hydroxide ethanol $$\gamma_{max.}=274 \text{ m}\mu; \epsilon=19{,}800$$

*Analysis.*—$C_{14}H_{22}O_5$: Molecular weight=270.32. Calculated: C, 62.2%; H, 8.2%. Found: C, 62.2%; H, 8.2%.

This compound is not described in the literature.

The ethyl-γ-allylacetylacetate was prepared according to the process described in J. of Am. Chem. Soc., 71, (1949), 3168.

*Step B: Preparation of allethrolone or 2-allyl-3-methyl-2-cyclopentene-4-ol-1-one.*—9 gm. of 4-allyl-5-diethoxymethyl-5-methyl-3-oxo-δ-valerolactone were introduced into 88 cc. of water and after 1.8 cc. of concentrated hydrochloric acid and a few hydroquinone crystals were added thereto, the reaction mixture was heated for 3 hours under reflux while slowly distilling, and maintaining the volume constant by addition of water. Then, the reaction mixture was cooled and sodium chloride was added thereto until saturation was attained after which the mixture was extracted with methylene chloride. Next, the extract was washed with an aqueous solution of sodium chloride and dried. The solvent was distilled off to obtain an oil which was rectified. The top fractions were discarded and the fraction which distilled between 101 and 104° C. under a 0.1 mm. vacuum was preserved. This fraction corresponded to allethrolone. Allethrolone thus obtained was converted to its 3,5-dinitrobenzoate which had a melting point of 130° C. The melting point and the Infrared Spectra of a mixture of the said product and a known sample of allethrolone 3,5-dinitrobenzoate prepared according to a different method proved the products were identical.

*Example. II.—Preparation of 3-methyl-2-cyclopentene-4-ol-1-one*

*Step A: Preparation of 5-diethoxymethyl-5-methyl-3-oxo-δ-valerolactone.*—Under agitation, 150 mg. of ferric nitrate were introduced into 400 cc. of liquid ammonia at a temperature of −70° C. and then 9.2 gm. of sodium were slowly added thereto to form a solution of sodium amide. On the other hand a mixture of 28 cc. of ethyl acetylacetate and 50 cc. of anhydrous ether was cooled to a temperature of −70° C. under an atmosphere of nitrogen, and a stream of ammonia was allowed to pass through this mixture until complete formation of ammonium salt was attained, which was recovered in the form of crystals. These crystals were introduced into the solution of sodium amide and the mixture was agitated for one half hour at a temperature of −35° C. Then, a solution of 14.7 gm. of the diethylacetal of pyruvaldehyde in 150 cc. of anhydrous ether was added and the agitation was maintained for 30 minutes at a low temperature. Next, 20 gm. of ammonium chloride were introduced into the reaction mixture, and after the ammonia was removed by heating over a bath maintained at room temperature, 100 cc. of anhydrous ether were added to the mixture, which was subsequently cooled to a temperature of −20° C. 300 cc. of 2 N hydrochloric acid were rapidly added, and the mixture was saturated with sodium chloride. The mixture was extracted with ether and the organic phase was washed with a solution of sodium chloride and dried. The solvent was removed by distillation and a gum was recovered which was rectified. The fraction distilling between 125° C. to 144° C. under a 0.3 mm. vacuum was recovered which was vacuum filtered, washed with a mixture of isopropyl ether-petroleum ether (1:1) and iced to obtain 5 - diethoxymethyl - 5 - methyl -3-oxo-δ-valerolactone having a melting point of 68° C.

The product occurred in the form of colorless crystals, soluble in water and in most of the usual organic solvents.

Ultra-violet spectra:
(1) mixture of ethanol—N/10 hydrochloric acid $$\lambda_{max.}=244 \text{ m}\mu; \epsilon=8{,}500$$

(2) mixture of ethanol—N/10 sodium hydroxide $$\lambda_{max.}=269\text{--}270 \text{ m}\mu; \epsilon=21{,}000$$

*Analysis.*—$C_{11}H_{18}O_5$; molecular weight=230.25. Calculated: C, 57.38%; H, 7.88%. Found: C, 57.35%; H, 7.9%.

This compound is not described in the literature.

*Step B: Preparation of 3-methyl-2-cyclopentene-4-ol-1-one.*—3 gm. of 5-diethoxymethyl-5-methyl-3-oxo-δ-valerolactone were introduced into 30 cc. of 2% aqueous hydrochloric acid and the reaction mixture was heated for 3 hours under reflux while slowly distilling and maintaining the volume constant by addition of water. Then, benzene was added and the water was eliminated by azeotropic distillation to dryness under vacuum. The residue dissolved in methylene chloride was absorbed on alumina and eluted with 100 cc. of methylene chloride.

The solvent of the eluate was removed and the resulting residue was distilled under 0.5 mm. vacuum at a temperature of 110° C. to obtain 3-methyl-2-cyclopentene-4-ol-1-one.

To characterize the product, the 3,5-dinitrobenzoate was formed as follows. 594 mg. of 3-methyl-2-cyclopentene-4-ol-1-one were introduced into 5 cc. of pyridine and 1.2 gm. of 3,5-dinitrobenzoic acid chloride were added, and the mixture was agitated for 1 hour at room temperature. Then, the mixture was poured into water and extracted with methylene chloride. The organic extract was washed with dilute hydrochloric acid, then with a sodium bicarbonate solution and finally with water again, dried and distilled to dryness. The residue obtained was subjected to chromatography through alumina followed by elution with methylene chloride. The eluate was crystallized from methanol to obtain 4-(3,5-dinitrobenzoyloxy)-3-methyl-2 - cyclopentene - 1 - one having a melting point of 168° C.

The product was colorless, insoluble in water and soluble in alcohol.

I.R. spectra and R. M. N. are in accord with the structure.

*Ultra-violet spectra* in ethanol:

$$\lambda_{max.}=217 \text{ m}\mu; \epsilon=41{,}300$$

*Analysis.*—$C_{13}H_{10}O_7N_2$; molecular weight=306.23. Calculated: C, 50.98%; H, 3.29%; N, 9.15%. Found: C, 51.3%; H, 3.6%; N, 9.2%.

This compound is not described in the literature.

Various modifications of the products and process of the invention may be made without departing from the spirit or scope thereof, and it is to be understood that the invention is to be limited as defined in the appended claims.

We claim:
1. A process for the preparation of 3-methyl-2-cyclopentene-4-ol-1-ones of the formula

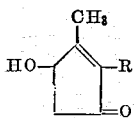

wherein R is selected from the group consisting of hydrogen and aliphatic hydrocarbons of 1 to 8 carbon atoms which comprises reacting a di-lower alkyl acetal of pyruvic aldehyde with an ester of γ-R-acetylacetic acid, wherein R has the above definition under anhydrous conditions in the presence of an alkaline agent selected from the group consisting of alkali metal amides and alkali metal hydrides to form the corresponding 4-R-5-dilower-alkoxymethyl-5-methyl-3-oxo-δ-valerolactone and treating the latter with an aqueous strong acid to form the corresponding 2-R-3-methyl-2-cyclopentene-4-ol-1-one.

2. The process of claim 1 wherein the first step is effected in liquid ammonia in the presence of sodium amide.

3. The process of claim 1 wherein the aqueous acid is aqueous hydrochloric acid.

4. The process of claim 1 wherein R is allyl.

5. 4-allyl-5-diethoxymethyl-5-methyl-3-oxo-δ-valerolactone.

6. 5 - diethoxymethyl - 5 - methyl - 3 - oxo - δ - valerolactone.

References Cited

UNITED STATES PATENTS 2,661,374   12/1953   Schechter _____ 260—586

FOREIGN PATENTS 305,076   7/1955   Japan.

BERNARD HELFIN, Primary Examiner.

LEON ZITVER, Examiner.

M. JACOB, Assistant Examiner.